United States Patent Office 3,303,049
Patented Feb. 7, 1967

3,303,049
ANTI-FOGGING TREATMENT FOR FILM AND COATED PRODUCT
Richard L. Hill, Williamsburg, Va., assignor to The Dow Chemical Company, Midland, Mich., a corporation of Delaware
No Drawing. Filed Mar. 25, 1963, Ser. No. 267,779
10 Claims. (Cl. 117—138.8)

This application is a continuation-in-part of my earlier application Serial No. 107,902, filed May 5, 1961, now abandoned.

This invention relates to anti-fogging thermoplastic resinous hydrophobic film and sheet and pertains to a method for the preparation thereof. It more particularly relates to articles of manufacture comprising a thermoplastic resinous hydrophobic polymer film or sheet having on at least one of its surfaces a coating of an anti-fogging composition.

Certain thermoplastic resinous hydrophobic polymers, because of their transparency and clarity, have potential use in the field of packaging, particularly in uses where an article is packaged in a container having a transparent window for viewing of the contents while at the same time protecting it from dust and other contamination. However, the tendency of hydrophobic polymeric film or sheet toward fogging when exposed to high humidity conditions by the condensing of moisture in the form of small individual droplets on the surface of the film or sheet not only is unsightly, but renders the film opaque in appearance.

It is a principal object of the invention to provide an anti-fogging treatment that will maintain transparent thermoplastic resinous hydrophobic sheet or film transparent under exposure to high humidity conditions and which is effective for long periods of time.

Another object is to provide new articles of manufacture comprising a transparent thermoplastic resinous hydrophobic film or sheet structure having on at least one of its surfaces, preferably on each of its major surfaces, an anti-fogging composition capable of maintaining the film or sheet in a visually transparent condition under high humidity conditions.

A further object of the invention is to provide a non-tacky, anti-static, non-blocking at 60° centigrade film with good slip characteristics and high scratch resistance.

According to the invention, anti-fogging transparent thermoplastic resinous hydrophobic shaped articles such as film and sheet are maintained transparent under conditions of high humidity by preparing a dispersion in an inert liquid carrier of an alkali metal salt of dodecyl monochlorodiphenyl oxide monosulfonate.

The transparent thermoplastic resinous hydrophobic film or sheet which may be employed in the practice of the invention may be prepared from alkenyl aromatic resins. By an alkenyl aromatic resin is meant a solid polymer of one or more polymerizable alkenyl aromatic compounds. The polymer or copolymer comprises, in chemically combined form, at least 50 percent by weight of at least one alkenyl aromatic compound having the general formula:

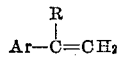

wherein Ar represents an aromatic hydrocarbon radical, or an aromatic halohydrocarbon radical of the benzene series, and R is hydrogen or the methyl radical. Examples of such alkenyl aromatic resins are the solid homopolymers of styrene, α-methylstyrene, ortho-methylstyrene, meta-methylstyrene, para-methylstyrene, Ar-ethylstyrene, Ar-vinylxylene, Ar-chlorostyrene, or Ar-bromostyrene; the solid copolymers of two or more of such alkenyl aromatic compounds with minor amounts of other readily polymerizable olefinic compounds such as divinyl benzene, acrylonitrile, etc. The polyolefins, such as polyethylene, polypropylene and copolymers of ethylene and propylene are eminently suited for the practice of the invention. Treatment in accordance with the invention is also effective on polyester resins such as polyethylene terephthalate. It is to be understood, however, that the present invention also comprehends shaped articles and films of any synthetic linear polyester prepared by reacting terephthalic acid, dialkyl terephthalates, or ester-forming derivatives thereof with a glycol of the series $HO(CH_2)_nOH$, where $n$ is a whole number within the range of 2–10. They may also include up to 20 percent by weight of a second acid or ester thereof, said second acid being selected from the group consisting of isophthalic acid, dibenzoic acid, hexa-hydro-terephthalic acid, adipic acid, sebacic acid, azelaic acid, naphthalic acid, 2,5-dimethyl terephthalic acid, and bis-p-carboxyphenoxy ethane. The practice of the invention is also successful with other thermoplastic resinous materials well known to the art, including those which may be comprised of thermoplastic polymers and copolymers of vinyl chloride, including homopolymeric vinyl chloride, thermoplastic ester and ether derivatives of cellulose including cellulose acetate, cellulose propionate, cellulose acetate butyrate, ethyl cellulose, and the like. Other hydrophobic thermoplastic resins which are beneficially treated by the present anti-fogging method are: chlorinated polyolefins such as chlorinated polyethylene, chlorinated polypropylene, and the like, as well as saran resins, which include thermoplastic copolymers of vinylidene chloride with one or more such monomers as vinyl chloride, acrylates and esters such as ethyl acrylate, vinyl propionate and the like.

The anti-fogging coating compositions are prepared by intimately incorporating the ingredients with one another to form a homogeneous composition in an inert liquid carrier which is then applied to the surfaces of the thermoplastic resinous hydrophobic film or sheet to produce the new articles of manufacture of the invention, namely the resinous film or sheet structure having on its surfaces a continuous coating of the anti-fogging composition. The proportion of the composition to be applied to the surfaces of the sheet or film to inhibit or prevent fogging of the structure need be only an amount of the composition sufficient to form a continuous monomolecular layer of the mixture of the surface active agents to the surfaces of the film or sheet. In its practical application somewhat greater proportions of the composition are used, usually in an amount sufficient to form a coating or continuous layer of the mixture of the surfactants which is at least 50 Angstroms thick, or between 50 and 500, preferably from 100 to 300 Angstroms thick.

The ingredients of the anti-fogging composition are conveniently mixed by dissolving or dispersing them in a liquid medium such as water, lower aliphatic alcohols or a mixture of water and a lower alkyl alcohol such as methanol, ethanol, isopropanol, n-propanol, or tert.-butyl alcohol, which liquid medium is a non-solvent for the base film or sheet.

Since only small proportions of the composition are required to produce a continuous coating or layer of the composition on the surfaces of the film or sheet and are effective in maintaining the resinous sheet transparent, the ingredients of the composition are mixed together in the liquid medium in the desired proportions in a total concentration of at least 0.1 percent, suitably from 0.1 to 10 percent by weight of the liquid dispersion or solution. Such dispersion or solution of the ingredients of the anti-fogging composition is applied to the surfaces of the sheet or film by brushing, dipping, spraying, roller coating or by doctor blades, and when applied as a wet layer of the dispersion or solution having a thickness of from about 0.1 to 1 mil, then dried, usually results in a continuous coating of from about 50 to 500 Angstroms thick of the anti-fogging composition on the treated surfaces of the film or sheet.

In some cases, certain polymeric compositions are prepared commercially having a thin layer of a hydrophobic oily substance on at least one surface; if such a layer is excessively thick, treatment of the film is facilitated by washing the surface with a detergent or solvent prior to treatment in accordance with the invention. Certain compositions such as some plasticized saran and polyvinyl chloride compositions have a tendency to exude or bleed plasticizer after fabrication. Washing of such materials prior to treatment will generally eliminate tendency toward uneven coating with the anti-fogging material.

The coated films and sheets of the invention are useful for a variety of purposes in the home and industry, such as packaging articles in cardboard boxes having viewing windows therein, as substitutes for glass window panes, or for packaging comestibles.

The following examples illustrate ways in which the principle of the invention has been applied, but are not to be construed as limiting its scope.

Example I

A solution of dodecyl monochlorodiphenyl oxide monosulfonate is prepared which resulted in a treating solution having 0.2 percent by weight of the surface active agent being evaluated in deionized water. The surface active agent solution was evaluated by coating on one mil thick polystyrene film, by means of a wire-wound rod, a wet coating approximately a quarter of a mil thick. This aqueous coating was then dried at about 80° centigrade, to leave a coating of the surface active agent weighing approximately 2 milligrams per square foot on the polystyrene film. Portions of the coated polystyrene film were tested for fogging by securing the film, coated side down, with a rubber band over the top of a 32 ounce glass jar containing about 6 ounces of water at 25°. The jar was placed in a refrigerator for 2 minutes, then was removed and examined for fogging.

Dodecyl monochlorodiphenyl oxide monosulfonate-treated polystyrene film showed excellent anti-fogging properties, whereas untreated polystyrene film was completely fogged. Exceptionally clear coatings are obtained when dodecyl monochlorodiphenyl oxide monosulfonate is employed as well as high resistance to blocking.

Example II

The procedure of Example I was repeated, with the exception that the polystyrene film was replaced with polyethylene film. Substantially similar results were obtained.

Example III

The procedure of Example I was repeated, with the exception that the polystyrene film was replaced with polypropylene film. Substantially similar results were obtained.

Example IV

The procedure of Example I was repeated, with the exception that the polystyrene film was replaced with polyvinyl chloride film. Substantially similar results were obtained.

Example V

The procedure of Example I was repeated, with the exception that the polystyrene film was replaced with saran film. Substantially similar results were obtained.

Example VI

The procedure of Example I was repeated, with the exception that the polystyrene film was replaced with cellulose acetate film. Substantially similar results were obtained.

Example VII

The procedure of Example I was repeated, with the exception that the polystyrene film was replaced with polyethylene terephthalate film. Substantially similar results were obtained.

Example VIII

The procedure of Example I was repeated, with the exception that the polystyrene film was replaced with saran coated cellophane film. Substantially similar results were obtained.

As is apparent; the method of the invention is susceptible of being embodied with various alterations and modifications from that which has been described in the preceding specification and description. Therefore, it is to be fully understood that all of the foregoing is merely intended to be illustrative and is not to be construed or interpreted as being restrictive or otherwise limiting of the present invention, excepting as it is set forth and defined in the appended claims.

What is claimed is:

1. An article of manufacture comprising a hydrophobic thermoplastic resinous shaped article wherein said shaped article is prepared from a hydrophobic thermoplastic resinous material selected from the group consisting of alkenyl aromatic resins, vinylidene chloride resins, cellulose esters, linear polyester resins of terephthalic acid, polyolefin resins and polyvinyl chloride resins containing a major portion of vinyl chloride polymerized therein having a coating on at least one surface of an alkali metal salt of dodecyl monochlorodiphenyl oxide monosulfonate; said coating having a thickness of between about 50 and about 500 Angstroms.

2. The article of manufacture of claim 1, wherein said shaped article is a film.

3. The article of manufacture of claim 1, wherein said hydrophobic thermoplastic resinous material is an alkenyl aromatic resin.

4. The article of claim 1, wherein said alkenyl aromatic resin is polystyrene.

5. The method of rendering a hydrophobic synthetic resinous shaped article resistant to fogging comprising dispersing in an inert liquid carrier an alkali metal salt of dodecyl monochlorodiphenyl oxide monosulfonate, coating the resultant dispersion onto said shaped article and removing said inert liquid carrier to leave relatively uniform coating on said article having a thickness between about 50 and about 500 Angstroms.

6. The method of rendering a hydrophobic synthetic resinous shaped article selected from the group consisting of alkyl aromatic resins, vinylidene chloride resins, cellulose esters, linear polyester resins of terephthalic acid, polyolefin resins and polyvinyl chloride resins containing a major portion of vinyl chloride polymerized therein, resistant to fogging, comprising dispersing in an inert liquid carrier an alkali metal salt of dodecyl monochlorodiphenyl oxide monosulfonate, coating the resultant dispersion onto said shaped article and removing said inert liquid carrier to leave relatively uniform coating on said article having a thickness between about 50 and about 500 Angstroms.

7. The method of claim 6, wherein said hydrophobic resinous shaped article is an alkenyl aromatic resinous shaped article.

8. The method of claim 6 wherein said hydrophobic resinous synthetic shaped article is a polyester resin.

9. The method of claim 6, wherein said hydrophobic resinous synthetic shaped article is a polyolefin resin.

10. The method of claim 6, wherein said hydrophobic resinous synthetic shaped article is a saran resin.

(References on following page)

References Cited by the Examiner

UNITED STATES PATENTS

| | | | |
|---|---|---|---|
| 2,333,794 | 11/1943 | Jones | 106—13 |
| 2,372,171 | 3/1945 | Bennett | 106—13 |
| 2,414,015 | 1/1947 | Carnes | 106—13 |
| 2,414,074 | 1/1947 | Vitalis | 106—13 |
| 2,416,254 | 2/1947 | Gilbert | 106—13 |
| 3,115,425 | 12/1963 | Zmoda | 252—91 |
| 3,222,210 | 12/1965 | Hammond. | |

RALPH S. KENDALL, *Primary Examiner.*

ALFRED L. LEAVITT, *Examiner.*

A. H. ROSENSTEIN, *Assistant Examiner.*